(12) United States Patent
Zhang et al.

(10) Patent No.: US 8,965,198 B2
(45) Date of Patent: Feb. 24, 2015

(54) SYSTEM AND METHOD FOR SHARED MESH RESTORATION IN OPTICAL NETWORKS

(71) Applicants: Qiong Zhang, Plano, TX (US); Paparao Palacharla, Richardson, TX (US); Xi Wang, Murphy, TX (US); Motoyoshi Sekiya, Richardson, TX (US)

(72) Inventors: Qiong Zhang, Plano, TX (US); Paparao Palacharla, Richardson, TX (US); Xi Wang, Murphy, TX (US); Motoyoshi Sekiya, Richardson, TX (US)

(73) Assignee: Fujitsu Limited, Kawasaki-shi (JP)

( * ) Notice: Subject to any disclaimer, the term of this patent is extended or adjusted under 35 U.S.C. 154(b) by 217 days.

(21) Appl. No.: 13/658,587

(22) Filed: Oct. 23, 2012

(65) Prior Publication Data

US 2013/0272693 A1 Oct. 17, 2013

Related U.S. Application Data

(60) Provisional application No. 61/623,763, filed on Apr. 13, 2012.

(51) Int. Cl.
*H04B 10/00* (2013.01)

(52) U.S. Cl.
USPC ............... 398/5; 398/1; 398/2; 398/3; 398/4; 398/17; 398/82; 398/83

(58) Field of Classification Search
CPC ............ H04B 10/03–10/038; H04Q 3/0075; H04Q 3/0079; H04J 14/02–14/022; H04J 14/0287–14/0297
USPC ............................................ 398/1–8, 79–88
See application file for complete search history.

(56) References Cited

U.S. PATENT DOCUMENTS

| | | | | |
|---|---|---|---|---|
| 7,499,647 B2 * | 3/2009 | Way et al. | | 398/3 |
| 7,751,714 B2 * | 7/2010 | Zhong et al. | | 398/83 |
| 7,769,256 B2 * | 8/2010 | Bai et al. | | 385/24 |
| 8,625,994 B2 * | 1/2014 | Archambault et al. | | 398/83 |
| 8,693,880 B2 * | 4/2014 | Sakauchi et al. | | 398/140 |
| 2008/0253762 A1 * | 10/2008 | Bai et al. | | 398/34 |
| 2008/0260383 A1 * | 10/2008 | Zhong et al. | | 398/50 |
| 2009/0232492 A1 * | 9/2009 | Blair et al. | | 398/5 |
| 2009/0232497 A1 * | 9/2009 | Archambault et al. | | 398/50 |
| 2011/0076016 A1 * | 3/2011 | Wisseman | | 398/48 |
| 2011/0116790 A1 * | 5/2011 | Sakauchi et al. | | 398/5 |
| 2012/0275779 A1 * | 11/2012 | Zhang | | 398/3 |
| 2013/0084063 A1 * | 4/2013 | Hu et al. | | 398/2 |
| 2013/0216216 A1 * | 8/2013 | Bottari et al. | | 398/5 |
| 2014/0133863 A1 * | 5/2014 | Mizutani | | 398/79 |

* cited by examiner

*Primary Examiner* — Li Liu
(74) *Attorney, Agent, or Firm* — Baker Botts L.L.P.

(57) ABSTRACT

A method for shared mesh restoration includes configuring a switch to allow sharing of a plurality of backup line cards across a plurality of node degrees associated with a reconfigurable optical add/drop multiplexer (ROADM). The switch is communicatively coupled to the ROADM. The method further includes configuring a number of backup line cards coupled to the switch. The number of backup line cards is based on determining a number of active backup lightpaths for each of a plurality of network failures associated with each of the plurality of node degrees of the ROADM, identifying which node degree and failure has the largest number of active backup lightpaths for all of the plurality of node degrees of the ROADM and for each of the plurality of network failures, and determining the number of backup line cards to configure based on the identified largest number of active backup lightpaths.

18 Claims, 6 Drawing Sheets

SYSTEM AND METHOD FOR SHARED MESH RESTORATION IN OPTICAL NETWORKS

RELATED APPLICATION

This application claims the benefit of U.S. Provisional Application Ser. No. 61/623,763 filed Apr. 13, 2012, entitled "Systems and Methods for Shared Mesh Restoration for Optical Transport Network/Wavelength Division Multiplexing Networks Using Colorless, Directionless, and Contentionless Reconfigurable Add/Drop Multiplexers," the contents of which is hereby incorporated by reference in its entirety.

TECHNICAL FIELD OF THE INVENTION

The present invention relates generally to optical communication networks and, more particularly, to shared mesh restoration in optical networks.

BACKGROUND

Telecommunications systems, cable television systems and data communication networks may use optical networks to rapidly convey large amounts of information between remote points. In an optical network, information may be conveyed in the form of optical signals through optical fibers. Optical fibers may comprise thin strands of glass capable of communicating the signals over long distances with very low loss. In the past, optical networks have employed a ring topology in which each node on the network connects to two other nodes. However, increases in traffic have necessitated the utilization of mesh topology. Mesh topology allows all nodes to be connected to each other. Such a configuration allows traffic to be rerouted as needed. Remote switching may be enabled using reconfigurable optical add/drop multiplexers (ROADMs).

The deployment of higher rate optical transmission at 40 Gigabits per second (Gb/s) and 100 Gb/s is driving the need for optical transport network (OTN) switching in core and metropolitan networks. OTN switching is able to groom a wide range of low-rate client traffic to efficiently fill 40 and 100 Gb/s line rate signals at the wavelength division multiplexing (WDM) layer (layer 1). Currently, traditional ROADMs are deployed at the WDM layer to provide full reconfigurability for transit wavelength channels but with fixed connectivity to specific node degree and wavelength for each add/drop port. Recent developments in ROADM technologies are enabling colorless, directionless (or non-directional), and contentionless features (CDC-ROADM) to also provide full reconfigurability between node degrees and add/drop ports. This flexibility of CDC-ROADMs may offer significant advantages in deploying future dynamic optical networks.

SUMMARY

In accordance with one or more embodiments of the present disclosure, a method for shared mesh restoration includes configuring a switch to allow sharing of a plurality of backup line cards across a plurality of node degrees associated with a reconfigurable optical add/drop multiplexer (ROADM). The switch is communicatively coupled to the ROADM. The method further includes configuring a number of backup line cards coupled to the switch. The number of backup line cards is based on determining a number of active backup lightpaths for each of a plurality of network failures associated with each of the plurality of node degrees of the ROADM, identifying which node degree and failure has the largest number of active backup lightpaths for all of the plurality of node degrees of the ROADM and for each of the plurality of network failures, and determining the number of backup line cards to configure based on the identified largest number of active backup lightpaths.

In accordance with another embodiment of the present disclosure, a network node for shared mesh restoration includes a switch communicatively coupled to a reconfigurable optical add/drop multiplexer (ROADM). The ROADM is associated with a plurality of node degrees. The network node includes a plurality of backup line cards that are coupled to the switch. The network node additionally sets up to configure the switch to allow sharing of the plurality of backup line cards across the plurality of node degrees associated with the ROADM. The network node also sets up to configure a number of backup line cards based on determining a number of active backup lightpaths for each of a plurality of network failures associated with each of the plurality of node degrees of the ROADM, identifying which node degree and failure has the largest number of active backup lightpaths for all of the plurality of node degrees of the ROADM and for each of the plurality of network failures, and determining the number of backup line cards to configure based on the identified largest number of active backup lightpaths.

In accordance with another embodiment of the present disclosure, a non-transitory computer-readable storage medium that includes logic for shared mesh restoration that when executed by a processor is operable to configure a switch to allow sharing of a plurality of backup line cards across a plurality of node degrees associated with a reconfigurable optical add/drop multiplexer (ROADM). The switch is communicatively coupled to the ROADM. The computer-readable storage medium additionally operable to configure a number of backup line cards coupled to the switch. The number of backup line cards based on determining a number of active backup lightpaths for each of a plurality of network failures associated with each of the plurality of node degrees of the ROADM, identifying which node degree and failure has the largest number of active backup lightpaths for all of the plurality of node degrees of the ROADM and for each of the plurality of network failures, and determining the number of backup line cards to configure based on the identified largest number of active backup lightpaths.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

Embodiments of the present invention and its advantages are best understood by referring to FIGS. 1-6, like numerals being used for like and corresponding parts of the various drawings.

Figure 1:
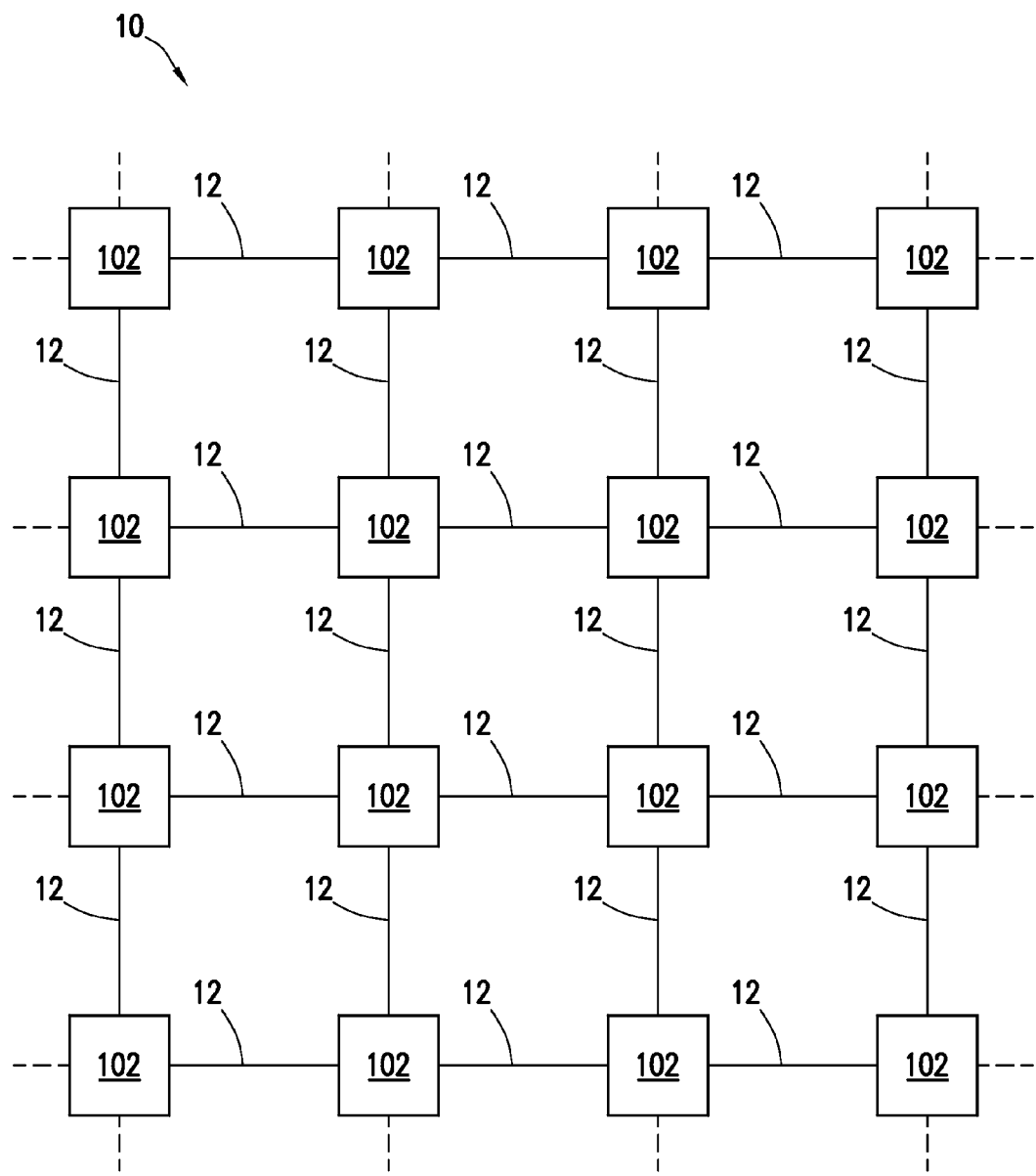
FIG. 1 illustrates a block diagram of an example network, in accordance with one embodiment of the present disclosure.

FIG. 1 illustrates a block diagram of an example network 10, in accordance with one embodiment of the present disclosure. In certain embodiments, network 10 may be a shared mesh network. Network 10 may include one or more transmission media 12 operable to transport one or more signals communicated by components of network 10. The components of network 10, coupled together by transmission media 12, may include a plurality of network elements or nodes 102. In the illustrated network 10, each node 102 is coupled to four other nodes 102 to create a mesh. However, any suitable configuration of any suitable number of nodes 102 may create network 10. Although network 10 is shown as a mesh network, network 10 may also be configured as a ring network, a point-to-point network, or any other suitable network or combination of networks. Network 10 may be used in a short-haul metropolitan network, a long-haul inter-city network, or any other suitable network or combination of networks. Network 10 may represent all or a portion of a short-haul metropolitan network, a long-haul inter-city network, and/or any other suitable network or combination of networks.

Each transmission medium 12 may include any system, device, or apparatus configured to communicatively couple nodes 102 to each other and communicate information between corresponding nodes 102. For example, a transmission medium 12 may include an optical fiber, an Ethernet cable, a T1 cable, copper cable, a WiFi signal, a Bluetooth signal, or other suitable medium. In embodiments of the present disclosure, optical fibers may include thin strands of glass capable of communicating signals over long distances with very low loss. Optical fibers may include any suitable type of fiber, such as a Single-Mode Fiber (SMF), Enhanced Large Effective Area Fiber (ELEAF), or a TrueWave® Reduced Slope (TW-RS) fiber. Information may be transmitted and received through network 10 by modulation of one or more wavelengths of light to encode the information on the wavelength. In optical networking, a wavelength of light may also be referred to as a channel. Each channel may be configured to carry a certain amount of information through network 10.

Network 10 may communicate information or "traffic" over transmission media 12. Traffic may include information transmitted, stored, or sorted in network 10. Such traffic may comprise optical or electrical signals configured to encode audio, video, textual, and/or any other suitable data. The data may be real-time or non-real-time. Traffic may be communicated via any suitable communications protocol, including, without limitation, the Open Systems Interconnection (OSI) standard and Internet Protocol (IP). Additionally, the traffic communicated in network 10 may be structured in any appropriate manner including, but not limited to, being structured in frames, packets, or an unstructured bit stream.

Each node 102 in network 10 may include any suitable system operable to transmit and receive traffic. In the illustrated embodiment, each node 102 may be operable to transmit traffic directly to one or more other nodes 102 and receive traffic directly from the one or more other nodes 102. Nodes 102 may include any suitable arrangement of components operable to perform the operations of the node 102. As an example, node 102 may include logic such as hardware, software, other logic, and/or any other suitable combination of the preceding. Logic may include a processor, as example, that may be any suitable device operable to execute instructions and manipulate data to perform operations. Node 102 may include an interface operable to receive input, send output, process the input and/or output, or any combination of the preceding. An interface may include ports, conversion software, or both. Node 102 may include memory, such as, logic operable to store and facilitate retrieval of information. Memory may include Random Access Memory (RAM), Read Only Memory (ROM), a 30 magnetic drive, a disk drive, a Compact Disk (CD) drive, a Digital Video Disk (DVD) drive, removable media storage, any other suitable data storage medium, or a combination of any of the preceding, and/or any other suitable components.

In certain embodiments of the present disclosure, nodes 102 may be configured to transmit optical signals through network 10 in specific wavelengths or channels. Nodes 102 may include any system, apparatus or device configured to convert an electrical signal into an optical signal and transmit the optical signal. For example, nodes 102 may each comprise a laser and a modulator configured to receive electrical signals and modulate the information contained in the electrical signals onto a beam of light produced by the laser at a particular wavelength and transmit the beam carrying the signal throughout the network. In embodiments of the present disclosure, nodes 102 may include client cards, switches, such as, optical transport network (OTN) switches, line cards, one or more multiplexers (MUX), one or more amplifiers, one or more reconfigurable optical add/drop multiplexers (ROADMs), and/or one or more receivers.

To increase the information carrying capabilities of network 10, multiple signals transmitted at multiple channels may be combined into a single optical signal. The process of communicating information at multiple channels of a single optical signal may be referred to in optics as wavelength division multiplexing (WDM). Dense wavelength division multiplexing (DWDM) may refer to the multiplexing of a larger (denser) number of wavelengths, usually greater than forty, into a fiber. WDM, DWDM, or other multi-wavelength transmission techniques may be employed in optical networks to increase the aggregate bandwidth per optical fiber. Without WDM or DWDM, the bandwidth in optical networks may be limited to the bit-rate of solely one wavelength. With more bandwidth, optical networks may be capable of transmitting greater amounts of information. Network 101 may be configured to transmit disparate channels using WDM, DWDM, or some other suitable multi-channel multiplexing technique, and/or to amplify the multi-channel signal.

Amplifiers may be utilized amplify the multi-channeled signals within network 10. Amplifiers may be positioned before and/or after certain lengths of transmission media 12. Amplifiers may comprise any system, apparatus, or device configured to amplify signals. For example, amplifiers may comprise an optical repeater that amplifies the optical signal. This amplification may be performed with opto-electrical or electro-optical conversion.

ROADMs may be included in node 102. ROADMs may include an add/drop bank, which may include any system, apparatus or device configured to add and/or drop optical signals. "Add" and "drop" with respect to a ROADM may refer to the capability to add one or more new wavelength channels to an existing multi-wavelength WDM signal, and/or to drop or remove one or more channels by passing those channels to another network path. A ROADM may be remotely reconfigurable such that the configuration of wavelengths may be accomplished by a remote network operator, e.g., a network operator may choose whether a wavelength is added, dropped, and/or passed through a ROADM. After passing through a ROADM, a signal may travel along transmission media 12 directly to a destination, or the signal may be passed through one or more additional ROADMs and/or other optical add/drop multiplexers (OADMs) before reaching a destination. A ROADM may utilize any suitable technology that may include wavelength blocking, planar lightwave circuit (PLC), and/or wavelength selective switching (WSS). A ROADM system may refer to a WDM or DWDM system that includes a ROADM subsystem.

Network 10 may be any OTN that utilizes equipment capable of switching traffic at the wavelength level or sub-wavelength level from an incoming fiber to an outgoing fiber. Shared mesh networks may be optical mesh networks that provide protection for a connection from a single failure by defining a backup lightpath, or "path," that is different from the primary lightpath. A lightpath may be any path taken by an optical signal between two points. In embodiments of the present disclosure, the wavelength level for a shared mesh network may be referred as the optical lightpath level or WDM level. The sub-wavelength level may be referred to as the OTN layer, synchronous optical networking (SONET) layer, and/or multiprotocol label switching (MPLS) level. The sub-wavelength level may offer finer granularity for backup lightpaths than the wavelength level offers.

Shared mesh restoration may refer to any system or method to minimize backup lightpaths in a mesh by sharing across multiple working and backup paths, in embodiments of the present disclosure. A survivable traffic grooming scheme may be employed for minimizing allocated capacity for both working and backup traffic. Shared mesh restoration may utilize only a single layer, such as wavelength or sub-wavelength layer, or multiple layers by incorporating the flexibility afforded by each layer (e.g., OTN layer with the flexibility of the WDM layer). Recent developments in ROADM technologies may enable colorless, directionless (or non-directional), and contentionless features (CDC-ROADM) to provide full reconfigurability between node degrees and add/drop ports. This flexibility of CDC-ROADMs may offer advantages in deploying future dynamic optical networks. Thus, shared mesh restoration can be performed at the optical layer using CDC-ROADMs and/or at the OTN layer using sublayer or OTN switches. Optical layer restoration is very coarse (e.g., at wavelength level) and may require longer backup paths and more regenerators. OTN layer restoration using electronic switching may provide sub-wavelength level restoration with better backup resource sharing due to finer granularity of bandwidth allocation.

In embodiments of the present disclosure, shared mesh restoration may utilize both the wavelength and sub-wavelength layers to minimize backup paths and/or backup bandwidth. For example, in shared mesh restoration, working connections may be routed and a disjoint backup connection may also be routed. Backup paths may utilize lightpaths carrying other working connections if there is available bandwidth. In embodiments of the present disclosure, backup lightpaths may be defined as lightpaths carrying only backup connections and working lightpaths may be defined as lightpaths carrying at least one working connection.

In order to minimize the allocated capacity or bandwidth for backup connections, backup paths may share resources based on conflict sets. A conflict set may be associated with a lightpath and may record a set of backup paths associated with the lightpath for a particular network failure or interruption of a lightpath. For example, a set $CS_e^i$ may represent a conflict set comprising backup paths associated with the lightpath e for a link failure $f_i$, where $0 \leq i \leq n$. A link failure or interruption of a lightpath may include any failure of transmission media 12 between any nodes 102. Generating conflict sets for each lightpath may output the working and backup paths of all connections.

FIG. 2 illustrates an example of an integrated network node 200 utilizing ROADM 202, in accordance with one embodiment of the present disclosure. Network node 200 may include ROADM 202 and sublayer switch 204. Sublayer switch 204 may include an OTN switch or any other suitable switching device. Sublayer switch 204 may be associated with client cards 208a, 208b, and 208c (collectively referred to as client cards 208) and working line cards (LCs) 206a, 206b, and 206c (collectively referred to as working LCs 206). Signals may travel in sublayer switch 204 from client cards 208 to working LCs 206.

Client cards 208 and working LCs 206 may include multiple ports that may connect or may be coupled to sublayer switch 204. A sub-wavelength connection on each port of client cards 208 may be mapped into an appropriate sized lower order optical data unit (LO-ODU) that may include adjusting the client signal rate and/or adding overhead information to ensure end-to-end connections. Multiple LO-ODU data streams may be associated with client card 208. For example, client card 208a may utilize two LO-ODU data streams while client cards 208b and 208c utilize one LO-ODU data stream. Signals from a port of client cards 208 may then be switched using sublayer switch 204. Sublayer switch 204 may forward signals to working LCs 206 for grooming. Grooming may be a process for grouping many small flows or signals into larger units that may be processed as single entities. For example, two flows that may be destined for a common node may be placed on the same wavelength.

Figure 2A:
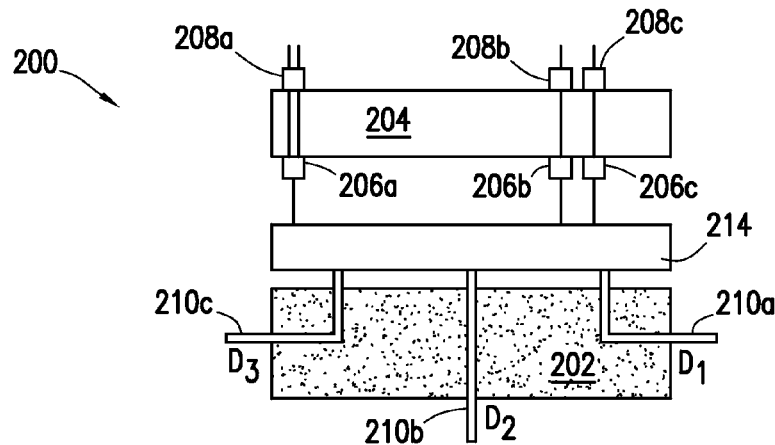
FIGS. 2A-C illustrate an example of an integrated network node utilizing a ROADM, in accordance with one embodiment of the present disclosure.

Shared mesh restoration schemes may assume that each lightpath may be statically assigned a particular working LC 206 associated with each end. Hence, the total number of working LCs 206 associated with a node may be equal to the total number of lightpaths terminating at the node. For example, FIG. 2a illustrates working LCs 206a, 206b, and 206c that may each be allocated to a lightpath. Each lightpath, as well as each port of the client cards 208 and working LCs 206, may include both a direction and color.

In certain embodiments, ROADM 202 may dedicate ports in add/drop bank 214 to a node degree or fiber 210. Add/drop bank 214 may be configured to add one or more new wavelength channels to an existing multi-wavelength WDM signal, and/or to drop or remove one or more channels by passing those channels to another network path. Add/drop bank 214 may further include a multiplexer, demultiplexer, any other system, apparatus or device configured to combine signals, in individual wavelengths into a single WDM or DWDM signal, and/or split a single WDM signal into its individual channels.

For example, FIG. 2a may include three optical fibers 210a, 210b, and 210c. Although FIG. 2 illustrates three fibers 210, more or fewer fibers 210 may be utilized in embodiments of the present disclosure. Fibers 210 may also be termed "degrees." Accordingly, fiber 210a may be termed degree one or $D_1$, fiber 210b may be termed degree two or $D_2$, and fiber 210c may be termed degree three or $D_3$. Thus, the example architecture depicted in FIG. 2a may comprise four LO-ODU data streams that may be transmitted to working LCs 206 coupled to three fixed node degrees or fibers 210.

Figure 2B:
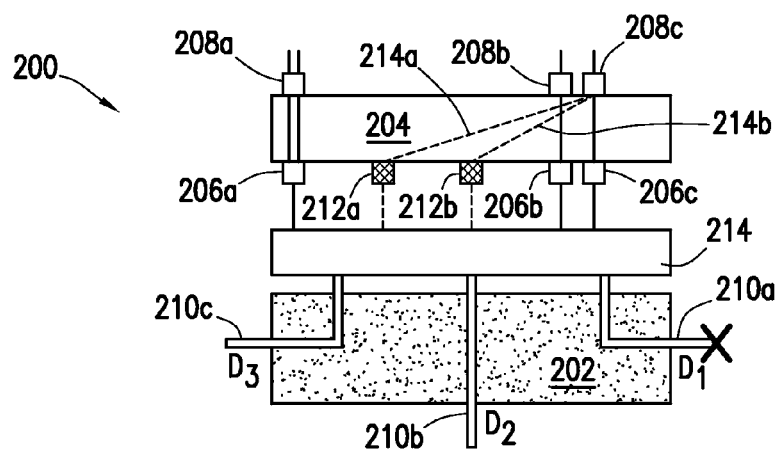

When a physical link (e.g., fiber link) fails associated with degree $D_1$ (either fiber 106a or another link between $D_1$ and the destination of the traffic sent via $D_1$) as shown in FIG. 2b, the backup traffic may be switched to ports associated with $D_2$ and $D_3$ by electronic switching at sublayer switch 204. Failures of links or interruption of a lightpath associated with a node degree may occur if a fiber 210 is cut, damaged, and/or any other action that may cause a loss of connection along fiber 210 (such as equipment failures in the lightpath). Sublayer switch 204 may determine that the lightpaths using $D_1$ may be inoperable. Sublayer switch 204 may reroute signals from client cards 208b and 208c to backup LCs 212a and 212b. Backup LC 212a may route the signal from client card 208b to $D_3$. Backup LC 212b may route the signal from client card 208c to $D_2$.

Figure 2C:
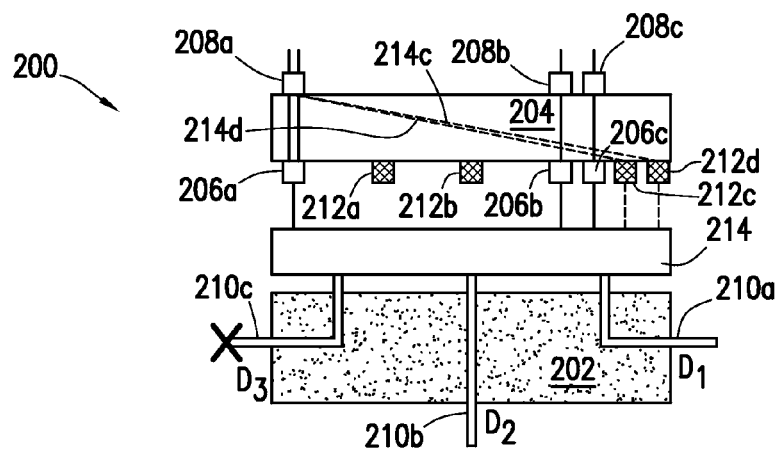

A failure or interruption of a lightpath associated with $D_3$ may occur as illustrated in FIG. 2c. When a physical link fails associated with $D_3$, the two backup connections may be switched to two ports associated with $D_1$ by sublayer switch 204, which may result in two additional backup LCs 212c and 212d associated with $D_1$. Sublayer switch 204 may determine that the lightpaths using $D_3$ may be inoperable. Sublayer switch 204 may reroute signals from client card 208a to backup LCs 212c and 212d. Backup LCs 212c and 212d may route the signals from client card 208a to $D_1$ creating two additional backup paths. Hence, the total number of backup LCs 212 associated with this node is four, which is equal to the total number of backup lightpaths.

In the present disclosure, the conflict set resulting from the shared mesh restoration scheme illustrated in FIG. 2, may be calculated in order to assign working LCs 206 and backup LCs 212. The total number of backup LCs 212 needed may be determined by calculating the maximum backup lightpaths for ROADM 202 as:

$$\sum_{\forall j} \max(D_j(f_1), \ldots, D_j(f_n))$$

where $D_j(f_i)$ is the number of statically assigned backup LCs 212 terminating at node degree j for restoring failure $f_i$.

Figure 3A:
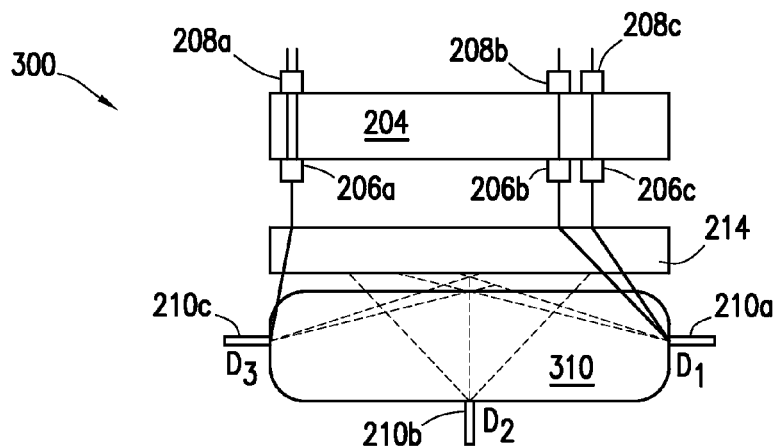
FIGS. 3A-C illustrate an example of an integrated network node utilizing a CDC-ROADM with reuse of backup line cards (LCs), in accordance with one embodiment of the present disclosure.

FIG. 3 illustrates an example of an integrated network node 300 utilizing CDC-ROADM 310 with reuse of backup LCs 212, in accordance with one embodiment of the present disclosure. Network node 300 may include CDC-ROADM 310 and sublayer switch 204. Sublayer switch 204 may include an OTN switch or any other suitable switching device. Sublayer switch 204 may be associated with client cards 208a, 208b, and 208c and working LCs 206a, 206b, and 206c. Signals may travel in sublayer switch 204 from client cards 208 to working LCs 206.

As discussed with reference to FIG. 2, client cards 208 and working LCs 206 may include multiple ports that may connect or may be coupled to sublayer switch 204. Multiple LO-ODUs data streams may be associated with a client card 208. For example, client card 208a may utilize two LO-ODU data streams while client cards 208b and 208c may utilize one LO-ODU data stream.

Figure 3B:
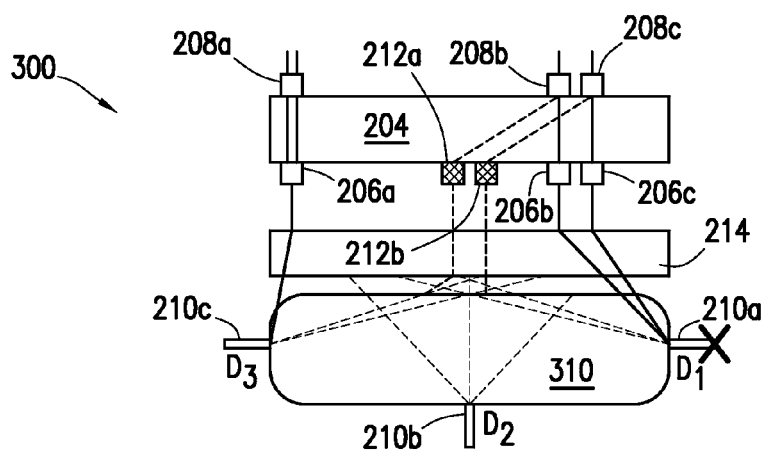
Figure 3C:
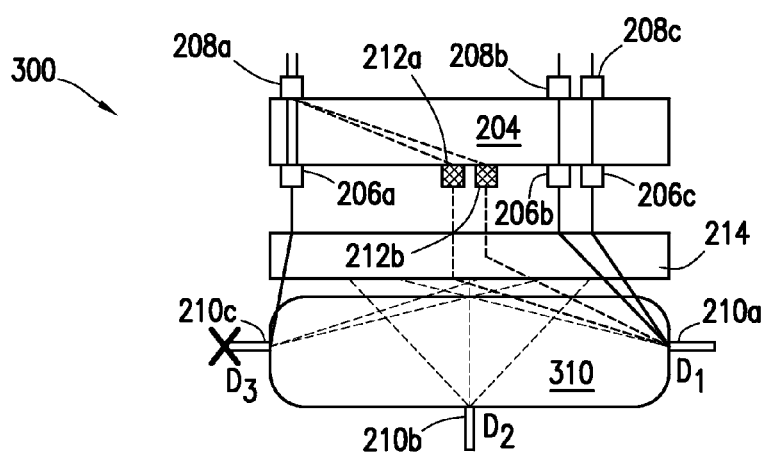

In the present embodiment, use of CDC-ROADM 310 may allow sharing of backup LCs 212. CDC-ROADM 310 may be able to process signals without respect to color or direction. Thus, CDC-ROADM 310 flexibility may allow working LCs 206 to be coupled to any node degree. When a physical link fails associated with $D_1$ (either fiber 106a or another link between $D_1$ and the destination of the traffic send via $D_1$), as shown in FIG. 3b, two backup LCs 212a and 212b may be required, in a similar manner as was discussed with reference to FIG. 2b. However, for a physical link failure or interruption of a lightpath associated with $D_3$, as shown in FIG. 3c, the two backup LCs 212a and 212b may be reused and switched to $D_1$ for the two backup connections. Hence, the total number of backup LCs 212 needed in the present example may be two.

A backup lightpath e may be active for a failure $f_i$ if it carries at least a backup connection upon the failure $f_i$, indicating that $CS_e^i \neq \Phi$ (conflict set is not empty). An inactive lightpath may not require any LCs upon the failure $f_i$, e.g., $CS_e^i = \Phi$. Thus, an inactive lightpath may have its LC reused by other lightpaths associated with the same CDC-ROADM. This may enable the flexible assignment of working LCs 206 and backup LCs 212 only to lightpaths or backup lightpaths that may be affected by a specific failure or interruption of a lightpath, thereby reducing the total number of working LCs 206 and backup LCs 212 allocated, as described in greater detail below.

In embodiments of the present disclosure, if $B_j(f_i)$ represents the number of active backup lightpaths terminating at a node degree j, which are used for restoring a link failure $f_i$ (whose $CS_e^i \neq \Phi$), then the number of backup LCs 212 needed is the maximum number of active backup lightpaths associated with all node degrees for any failure, which can be formulated as:

$$\max\left(\sum_{\forall j} B_j(f_1), \ldots, \sum_{\forall j} B_j(f_i)\right)$$

Figure 4A:
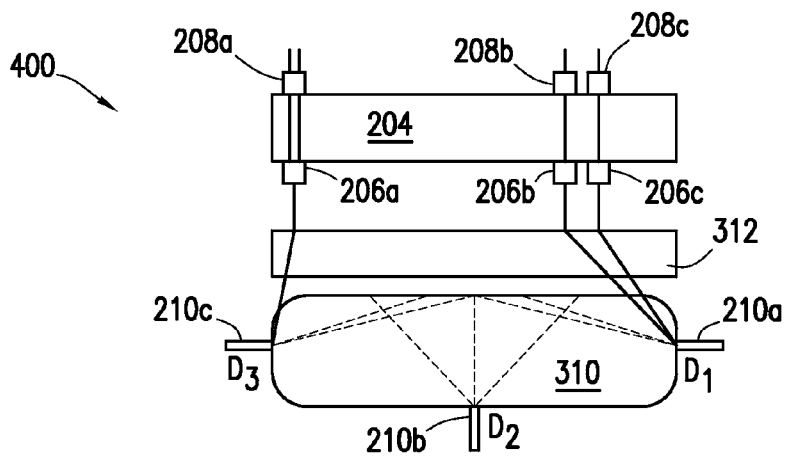
FIGS. 4A-C illustrate an example of an integrated network node utilizing a CDC-ROADM with reuse of backup LCs and working LCs, in accordance with one embodiment of the present disclosure.
Figure 4B:
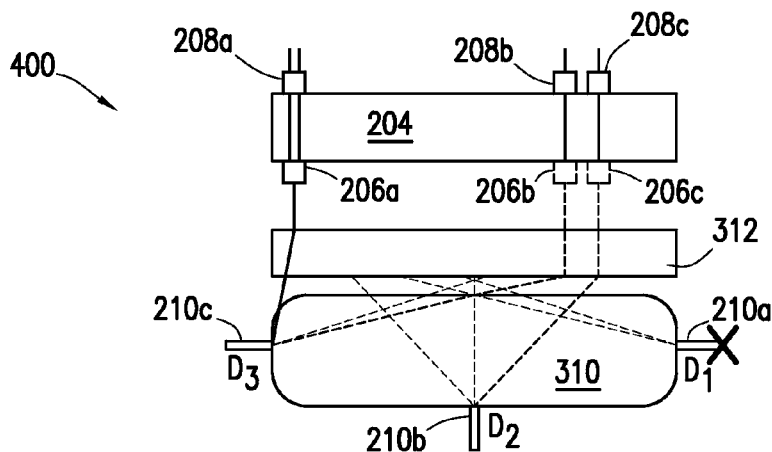
Figure 4C:
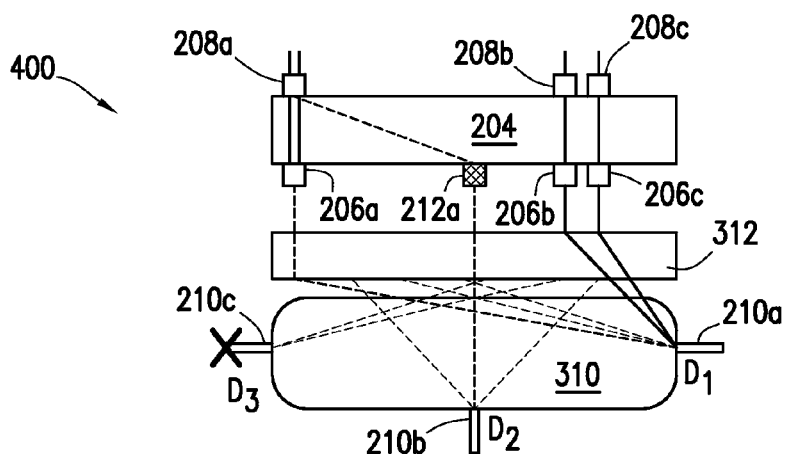

FIG. 4 illustrates an example of an integrated network node 400 utilizing CDC-ROADM 310 with reuse of backup LCs 212 and working LCs 206, in accordance with one embodiment of the present disclosure. Network node 400 illustrates an integrated architecture that may be similar to FIG. 3, with the addition of reuse of working LCs 206 as a backup LC. For example, for a failure or interruption of a lightpath associated with $D_1$, the two working LCs 206b and 206c may be reused for the connections switched to $D_2$ and $D_3$, as shown in FIG. 4b. For a failure or interruption of a lightpath associated with $D_3$, as shown in FIG. 4c, only one backup LC 212b may be utilized, as the working LC 206a may be reused for one of the connections switched to $D_1$.

In embodiments of the present disclosure, $W_j(f_i)$ may be the number of working lightpaths terminating at node degree j, whose working traffic may have been interrupted due to a failure $f_i$. $B_j(f_i)$ may represent the number of active backup lightpaths terminating at a node degree j, which are used for restoring a link failure $f_i$. The number of backup LCs 212 needed in addition to the reusable working LCs 206 associated with all node degrees for any failure may be formulated as:

$$\max\left(\left(\sum_{\forall j} B_j(f_1) - \sum_{\forall j} W_j(f_1)\right), \ldots, \left(\sum_{\forall j} B_j(f_n) - \sum_{\forall j} W_j(f_n)\right)\right)$$

The formulations disclosed above may be used to determine the required backup LCs 212 for shared mesh restoration in OTN/WDM networks. Although the foregoing contemplates examples with integrated nodes, the restoration scheme disclosed herein may also apply to separate OTN and ROADM systems. In addition, although the foregoing contemplates use of CDC-ROADMs, application of the systems and method disclosed herein may employ colorless, directionless ROADMs (CD-ROADMs). Furthermore, although the foregoing contemplates application of the methods and systems disclosed herein to OTNs, the methods and systems disclosed herein may also be applicable to Internet Protocol (IP)/Wavelength Divisional Multiplexing (WDM) networks using CDC-ROADMs.

Figure 5:
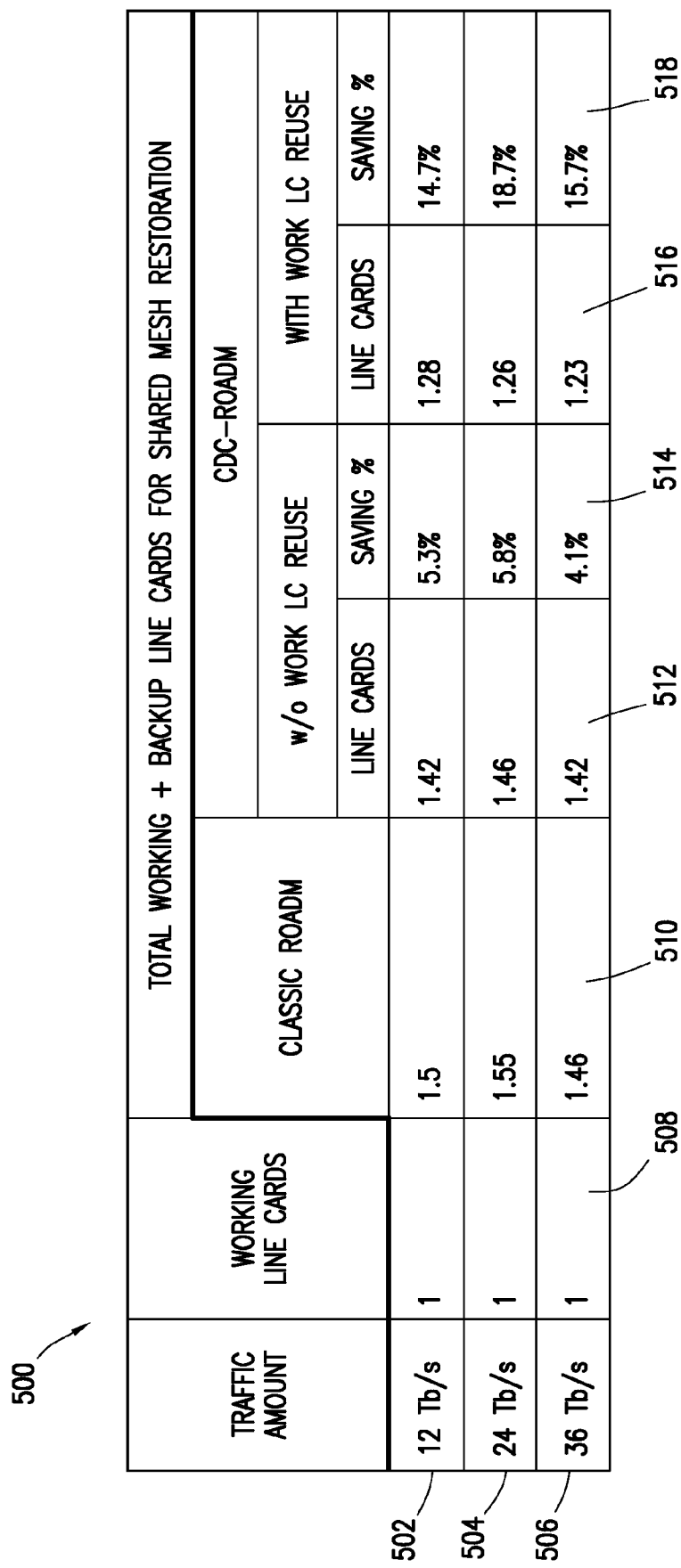
FIG. 5 illustrates example results table from a shared mesh restoration simulation, in accordance with embodiments of the present disclosure.

FIG. 5 illustrates example results table 500 from a shared mesh restoration simulation, in accordance with embodiments of the present disclosure. An example simulation may include approximately twenty-four node network comprising approximately forty-three bi-directional links. For purposes of the simulation, each fiber link may support approximately eighty-eight wavelengths and each wavelength may operate at a rate of approximately 100 Gb/s. A traffic matrix of LO-ODU demands with rates of approximately 1.25 Gb/s, 2.5 Gb/s, or 10 Gb/s may be generated. Traffic may be distributed among nodes according to a metropolitan network traffic pattern, e.g., approximately 40% of traffic may be generated among approximately ten selected core nodes and remaining traffic may be generated between core nodes and other nodes in the network.

For purposes of the example simulation, shared mesh restoration may be implemented using an auxiliary graph approach for traffic grooming, routing and wavelength assignment. Working connections may be routed such that the number of LCs required for working traffic may be minimized. In this case, most working lightpaths may be almost fully filled, which may reduce the likelihood of mixing working and backup traffic in the same lightpath, thus more backup LCs may be reused. In the simulations, the backup path of each connection may be routed after removing the lightpaths used by its corresponding working path and may maximize the sharing of resources. The simulation may not include blocking for working and backup traffic in the network.

FIG. 5 compares the relative ratio of LCs required with the architectures described above with respect to FIGS. 2-4, in accordance with results associated with the simulation described above. Rows 504 and 506 respectively may depict approximate results with a traffic amount two and three times the amount set forth in the row 502. Column 508 illustrates that for each traffic matrix, the number of LCs allocated for working traffic may be normalized to approximately one. Column 510 illustrates results for an OTN switch over traditional ROADM, such as shown in FIG. 2. For example, at a traffic amount of 24 Tb/s the normalized total of approximately 1.55 LCs may be necessary for both working and backup traffic. As depicted in columns 512 and 514, the flexibility provided by CDC-ROADMs (e.g., the configuration illustrated by FIG. 3) may reduce the approximate number of LCs to 1.46 at a savings of 5.8% compared to traditional ROADMs. Columns 516 and 518 illustrate the case of reusing working LCs (e.g., the configuration shown in FIG. 4). As example, the normalized total number of LCs may be reduced to 1.26 and reflect a savings of approximately 18%. Simulations of other realistic network topologies may result in other reductions in LCs.

Figure 6:
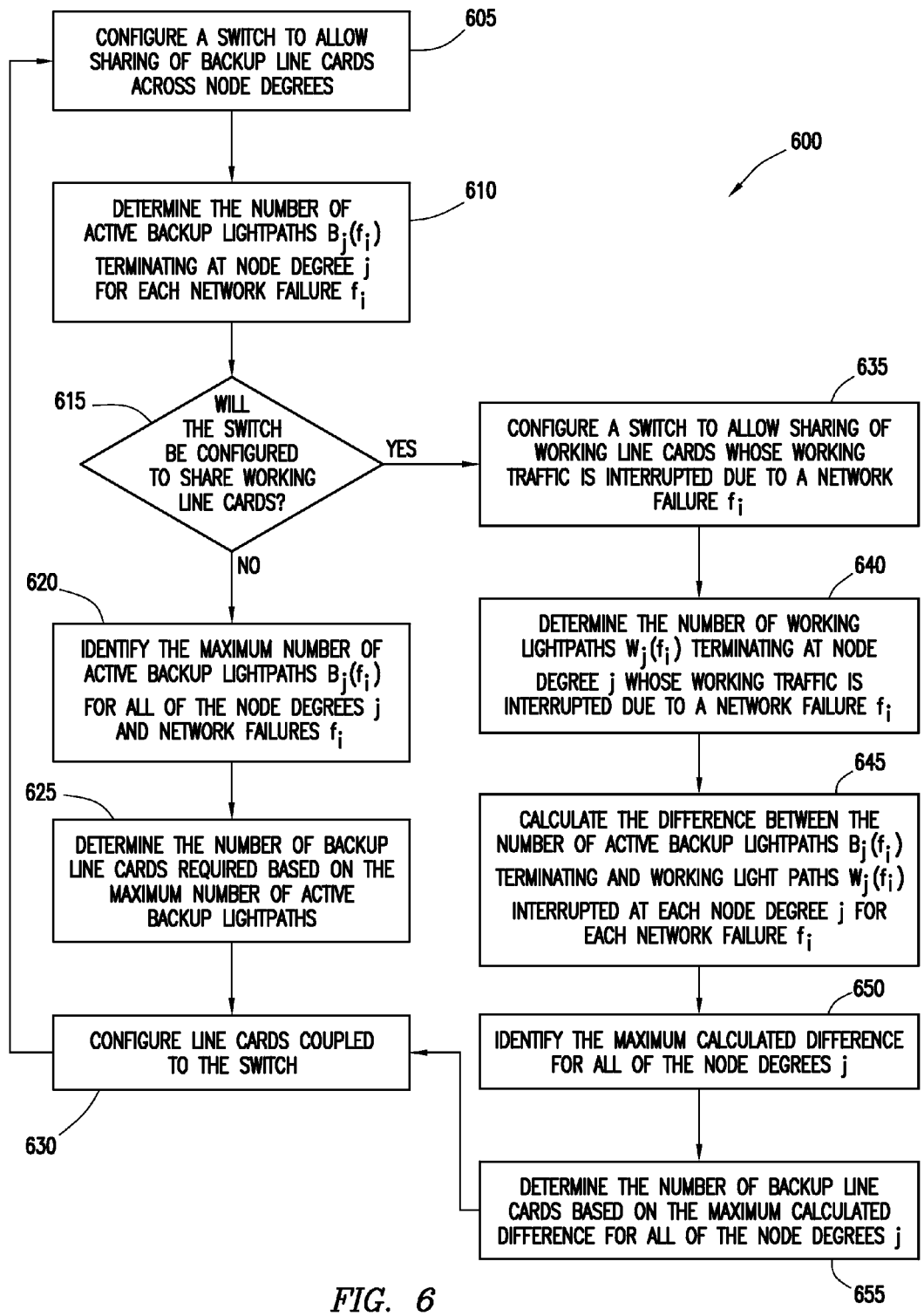
FIG. 6 illustrates a method for shared mesh restoration in optical networks, in accordance with one embodiment of the present disclosure.

FIG. 6 illustrates a method 600 for shared mesh restoration in optical networks, in accordance with one embodiment of the present disclosure. Method 600 may be implemented fully or in part in association with network node 300 or 400 of FIG. 3 or 4, respectively. The steps of method 600 may be performed by hardware, software, firmware or any combination thereof, configured to perform shared mesh restoration. The software or firmware may include instructions stored on computer-readable medium, and operable to perform, when executed, one or more of the steps described below. The computer-readable media may include any system, apparatus or device configured to store and retrieve programs or instructions such as a hard disk drive, a compact disc, flash memory or any other suitable device. The software or firmware may be configured to direct a processor or other suitable unit to retrieve and execute the instructions from the computer-readable media. For illustrative purposes, method 600 is described with respect to network 10 of FIG. 1 and network nodes 300 and 400 of FIGS. 3 and 4, respectively; however, method 600 may be used for shared mesh restoration on any suitable network.

Method 600 may be repeated or performed in parallel for each one of the network nodes 102 illustrated in FIG. 1. In addition, although FIG. 6 discloses a certain order of steps to be taken with respect to method 600, the steps comprising method 600 may be completed in any suitable order.

At step 605, the network node may configure a switch to allow sharing of backup line cards. For example, network node 300 of FIG. 3 may configure sublayer switch 204 such that backup line cards 212 may be shared across multiple node degrees. Sharing may be accomplished by the use of CDC-ROADM 310. Method 600 may proceed to step 610.

At step 610, the network node may determine the number of active backup lightpaths $B_j(f_i)$ terminating at node degree j for each network failure $f_i$. As an example, with reference to FIGS. 3 and 4, network node 300 or 400 may determine that for a failure associated with an interruption of a lightpath including node degree $D_1$ there are two active backup lightpaths that are required. Method 600 may proceed to step 615.

At step 615, the network node may determine if the switch is configured to share working line cards in addition to the backup line cards. If the switch will be configured to share working line cards, method 600 may proceed to step 635. If the switch is not configured to share working line cards, method 600 may proceed to step 620.

At step 620, the network node may identify the maximum number of active backup lightpaths $B_j(f_i)$ for all of the node degrees j and all potential failures $f_i$. For example, network node 300 of FIG. 3 may determine the maximum number of active backup lightpaths required for each failure $f_i$, associated with an interruption of a lightpath including all node degrees, $D_1$, $D_2$, and $D_3$. Method 600 may proceed to step 625.

At step 625, the network node may determine the number of backup line cards that are required based on the maximum number of active backup lightpaths determined at step 620. As example, network node 300 may determine that the maximum number of active backup lightpaths is two. Thus, the maximum number of backup line cards may also be two. Method 600 may proceed to step 630.

At step 630, the network node may configure the number of backup line cards required on or coupled to the switch. Network node 300 may configure two backup line cards on sublayer switch 204, with reference to FIG. 3. Method 600 may then return to step 605.

If at step 615, the switch will be configured to share working line cards, method 600 may proceed to step 635. At step 635, the network node may configure a switch to allow sharing of working line cards whose working traffic is interrupted due to a network failure $f_i$. For example, network node 400 of FIG. 4 may configure sublayer switch 204 to allow sharing of working line cards 206 associated with working lightpaths whose traffic may be interrupted due to a network failure $f_i$. Method 600 may proceed to step 640.

At step 640, the network node may determine the number of working lightpaths $W_j(f_i)$ terminating at node degree j whose working traffic is interrupted due to a network failure $f_i$. For example, network node 400 may determine that two working light paths may be interrupted by a network failure associated with $D_3$. Method 600 may proceed to step 645.

At step 645, the network node may calculate the difference between the number of active backup lightpaths $B_j(f_i)$ terminating and working lightpaths $W_j(f_i)$ interrupted at each node degree j for each network failure $f_i$. For example, with reference to FIG. 4, network node 400 may calculate $B_j(f_i)-W_j(f_i)$ for each node degree, $D_1$, $D_2$, and $D_3$ affected by each network failure $f_i$. For $D_3$, network node 400 may calculate that $B_j(f_i)=2$ and $W_j(f_i)=1$, thus the difference is one. Method 600 may proceed to step 650.

At step 650, the network node may identify the maximum calculated difference for all of the node degrees j. Based on this maximum calculated difference, the network node may determine the number of backup line cards based the maximum calculated difference for all of the node degrees j at step 655. For example, network node 400 of FIG. 4 may determine the maximum calculated difference is one, and thus, the number of backup line cards may also be one. Method 600 may proceed to step 630.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could me made hereto without departing from the spirit and scope of the invention.

What is claimed is:

1. A method for shared mesh restoration, comprising:
   configuring, by a processor, a switch to allow sharing of a plurality of backup line cards across a plurality of node degrees associated with a reconfigurable optical add/drop multiplexer (ROADM), the switch communicatively coupled to the ROADM; and
   configuring, by the processor, a number of backup line cards coupled to the switch, the number of backup line cards based on:
   for each of a plurality of network failures associated with each of the plurality of node degrees of the ROADM, determining, by the processor, a number of active backup lightpaths;
   for all of the plurality of node degrees of the ROADM and for each of the plurality of network failures, identifying, by the processor, which node degree and failure has the largest number of active backup lightpaths; and
   determining, by the processor, the number of backup line cards to configure based on the identified largest number of active backup lightpaths.

2. The method of claim 1, wherein configuring the switch further comprises configuring, by the processor, the switch to allow sharing of one or more of a plurality of working line cards.

3. The method of claim 2, wherein determining the number of backup line cards to configure is further based on:
   for each of the plurality of node degrees of the ROADM, determining, by the processor, a number of working lightpaths that are interrupted by each of the plurality of network failures;
   for each of the plurality of node degrees of the ROADM, calculating, by the processor, a difference between the number of active backup lightpaths and the number of working lightpaths that are interrupted by each of the plurality of network failures;
   for all of the plurality of node degrees of the ROADM and for each of the plurality of network failures, identifying, by the processor, which node degree and failure has the largest calculated difference between the number of active backup lightpaths and the number of working lightpaths that are interrupted by each of the plurality of network failures; and
   determining, by the processor, the number of backup line cards to configure based on the identified largest difference between the number of active backup lightpaths and the number of working lightpaths.

4. The method of claim 1, wherein the ROADM comprises a colorless directionless ROADM (CD-ROADM).

5. The method of claim 1, wherein the ROADM comprises a colorless, directionless, and contentionless ROADM (CDC-ROADM).

6. The method of claim 1, wherein the switch comprises an optical transport network (OTN) switch.

7. A network node for shared mesh restoration, comprising:
   a switch communicatively coupled to a reconfigurable optical add/drop multiplexer (ROADM), the ROADM associated with a plurality of node degrees;
   a plurality of backup line cards coupled to the switch;
   the network node configured to:
   configure the switch to allow sharing of the plurality of backup line cards across the plurality of node degrees associated with the ROADM;
   configure a number of backup line cards based on:
   for each of a plurality of network failures associated with each of the plurality of node degrees of the ROADM, determine a number of active backup lightpaths;
   for all of the plurality of node degrees of the ROADM and for each of the plurality of network failures, identify which node degree and failure has the largest number of active backup lightpaths; and
   determine the number of backup line cards to configure based on the identified largest number of active backup lightpaths.

8. The network node of claim 7, wherein the network node is further configured to configure the switch to allow sharing of one or more of a plurality of working line cards.

9. The network node of claim 8, wherein the network node is further configured to determine the number of backup line cards to configure based on:
   for each of the plurality of node degrees of the ROADM, determine a number of working lightpaths that are interrupted by each of the plurality of network failures;
   for each of the plurality of node degrees of the ROADM, calculate a difference between the number of active backup lightpaths and the number of working lightpaths that are interrupted by each of the plurality of network failures;
   for all of the plurality of node degrees of the ROADM and for each of the plurality of network failures, identify which node degree and failure has the largest calculated difference between the number of active backup lightpaths and the number of working lightpaths that are interrupted by each of the plurality of network failures; and
   determine the number of backup line cards to configure based on the identified largest difference between the number of active backup lightpaths and the number of working lightpaths.

10. The network node of claim 7, wherein the ROADM comprises a colorless directionless ROADM (CD-ROADM).

11. The network node of claim 7, wherein the ROADM comprises a colorless, directionless, and contentionless ROADM (CDC-ROADM).

12. The network node of claim 7, wherein the switch comprises an optical transport network (OTN) switch.

13. A non-transitory computer-readable storage medium comprising logic for shared mesh restoration, the logic when executed by a processor operable to:
configure a switch to allow sharing of a plurality of backup line cards across a plurality of node degrees associated with a reconfigurable optical add/drop multiplexer (ROADM), the switch communicatively coupled to the ROADM; and
configure a number of backup line cards coupled to the switch, the number of backup line cards based on:
for each of a plurality of network failures associated with each of the plurality of node degrees of the ROADM, determine a number of active backup lightpaths;
for all of the plurality of node degrees of the ROADM and for each of the plurality of network failures, identify which node degree and failure has the largest number of active backup lightpaths; and
determine the number of backup line cards to configure based on the identified largest number of active backup lightpaths.

14. The computer-readable storage medium of claim 13, wherein the logic operable to configure the switch further configures the switch to allow sharing of one or more of a plurality of working line cards.

15. The computer-readable storage medium of claim 14, wherein the logic operable to determine the number of backup line cards to configure is further based on:
for each of the plurality of node degrees of the ROADM, determine a number of working lightpaths that are interrupted by each of the plurality of network failures;
for each of the plurality of node degrees of the ROADM, calculate a difference between the number of active backup lightpaths and the number of working lightpaths that are interrupted by each of the plurality of network failures;
for all of the plurality of node degrees of the ROADM and for each of the plurality of network failures, identify which node degree and failure has the largest calculated difference between the number of active backup lightpaths and the number of working lightpaths that are interrupted by each of the plurality of network failures; and
determine the number of backup line cards to configure based on the identified largest difference between the number of active backup lightpaths and the number of working lightpaths.

16. The computer-readable storage medium of claim 13, wherein the ROADM comprises a colorless directionless ROADM (CD-ROADM).

17. The computer-readable storage medium of claim 13, wherein the ROADM comprises a colorless, directionless, and contentionless ROADM (CDC-ROADM).

18. The computer-readable storage medium of claim 13, wherein the switch comprises an optical transport network (OTN) switch.

* * * * *